United States Patent
Kim et al.

(10) Patent No.: US 10,122,999 B2
(45) Date of Patent: Nov. 6, 2018

(54) IMAGE GENERATING METHOD AND IMAGE GENERATING APPARATUS

(71) Applicant: SAMSUNG ELECTRONICS CO., LTD., Suwon-si (KR)

(72) Inventors: Jinmyoung Kim, Hwaseong-si (KR); Sunguk Bin, Suwon-si (KR); Namseop Kwon, Suwon-si (KR); Yonghwa Park, Yongin-si (KR); Myungjae Jeon, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 176 days.

(21) Appl. No.: 15/157,633

(22) Filed: May 18, 2016

(65) Prior Publication Data
US 2017/0118459 A1   Apr. 27, 2017

(30) Foreign Application Priority Data
Oct. 27, 2015   (KR) .......................... 10-2015-0149734

(51) Int. Cl.
| H04N 13/00 | (2018.01) |
| H04N 5/33 | (2006.01) |
| H04N 13/296 | (2018.01) |
| H04N 13/254 | (2018.01) |
| G01S 17/89 | (2006.01) |
| G01S 7/491 | (2006.01) |

(52) U.S. Cl.
CPC ......... *H04N 13/296* (2018.05); *G01S 7/4918* (2013.01); *G01S 17/89* (2013.01); *H04N 5/33* (2013.01); *H04N 13/254* (2018.05)

(58) Field of Classification Search
CPC .. H04N 5/33; H04N 13/0253; H04N 13/0296; G01S 17/89; G01S 7/4918
See application file for complete search history.

(56) References Cited

U.S. PATENT DOCUMENTS

2006/0017656 A1*   1/2006   Miyahara .................. B60R 1/00
                                                        345/8
2008/0237445 A1   10/2008   Ikeno et al.
(Continued)

FOREIGN PATENT DOCUMENTS

JP   2010-71832 A    4/2010
JP   2012-237720 A   12/2012
(Continued)

OTHER PUBLICATIONS

Avigilon: Adaptive IR Technology White Paper SUPPORT 1.888.281.5182, avigilon.com, Apr. 2016 (10 Pages Total).
(Continued)

*Primary Examiner* — Huy T Nguyen
(74) *Attorney, Agent, or Firm* — Sughrue Mion, PLLC

(57) ABSTRACT

A camera includes: a light source configured to emit an infrared (IR) signal; a receiver configured to receive a reflected IR signal, the reflected signal corresponding to the IR signal being reflected from an object; and a processor configured to generate an IR image based on the reflected IR signal, determine whether the IR image is saturated based on comparison between at least one pixel value of the IR image and a reference pixel value, and control an intensity of the IR signal emitted by the light source based on a result of the determination.

17 Claims, 12 Drawing Sheets

(56) References Cited

U.S. PATENT DOCUMENTS

| | | |
|---|---|---|
| 2011/0293179 A1 | 12/2011 | Dikmen et al. |
| 2013/0010207 A1* | 1/2013 | Valik .................. G06F 3/017 348/734 |
| 2013/0050426 A1 | 2/2013 | Sarmast et al. |

FOREIGN PATENT DOCUMENTS

| | | |
|---|---|---|
| JP | 2014-62982 A | 4/2014 |
| KR | 10-2013-0134739 A | 12/2012 |
| KR | 10-2014-0073117 A | 6/2014 |

OTHER PUBLICATIONS

Communication dated Sep. 21, 2016, issued by the European Patent Office in counterpart European Application No. 16172385.3.

\* cited by examiner

IMAGE GENERATING METHOD AND IMAGE GENERATING APPARATUS

CROSS-REFERENCE TO RELATED APPLICATION

This application claims priority from Korean Patent Application No. 10-2015-0149734, filed on Oct. 27, 2015 in the Korean Intellectual Property Office, the disclosure of which is incorporated herein by reference in its entirety.

BACKGROUND

1. Field

Apparatuses and methods consistent with exemplary embodiments relate to generating depth images to locate objects nearby.

2. Description of the Related Art

An infrared (IR) image is an image that shows a distance between objects located in a three-dimensional (3D) space. An electronic device may measure a distance between the electronic device and an object and generate an IR image based on the measured distance. For example, the electronic device, such as a camera, a mobile phone, or a television (TV), may generate an IR image.

The intensity of light reflected from the object is inversely proportional to the square of the distance between the electronic device and the object. Therefore, as a measurement distance increases, the electronic device receives a smaller amount of light from an object. When the received amount of light is less than a minimum light intensity level, accuracy of depth information in the IR image may deteriorate. In addition, if the electronic device increases the intensity of a light source, an object located at a short distance from the electronic device reflects a larger amount of light. When the received amount of light is greater than a maximum light intensity level, the pixel values in the IR image may be saturated.

SUMMARY

Exemplary embodiments address at least the above problems and/or disadvantages and other disadvantages not described above. Also, the exemplary embodiments are not required to overcome the disadvantages described above, and may not overcome any of the problems described above.

One or more exemplary embodiments provide methods and apparatuses for generating a high dynamic range image.

According to an aspect of an exemplary embodiment, there is provided a camera for generating a three-dimensional (3D) infrared (IR) image including: a light source configured to emit an IR signal; a receiver configured to receive a reflected IR signal, the reflected IR signal corresponding to the IR signal being reflected from an object; and a processor configured to generate an IR image based on the reflected IR signal, determine whether the IR image is saturated based on comparison between at least one pixel value of the IR image and a reference pixel value, and control an intensity of the IR signal emitted by the light source based on a result of the determination.

The processor may be further configured to set the reference pixel value, and determine that the IR image is saturated when the at least one pixel value of the IR image is greater than the reference pixel value.

The processor may be further configured to gradually reduce or increase the intensity of the IR signal emitted by the light source up to a maximum intensity at which the IR image is unsaturated.

The processor may be further configured to, in response to determining that the IR image is saturated, reduce the intensity of the IR signal emitted by the light source to a lowest level and gradually increase the intensity of the IR signal emitted by the light source up to a maximum intensity at which the IR image is unsaturated.

The processor may be further configured to, in response to determining that the IR image is saturated, reduce the intensity of the IR signal emitted by the light source to a lowest level and determine an optimal intensity of the IR signal emitted by the light source based on a saturation degree of the IR image.

The light source may be further configured to emit four IR signals having different phases, the four IR signals being reflected from the object, and the processor may be further configured to determine whether the IR image is saturated based on at least one of the reflected four IR signals.

The processor may be further configured to, when the camera is operated using a global shutter method, determine whether the IR image is saturated based on a frame corresponding to a phase of about 0 degrees.

The processor may be further configured to, when the camera is operated using a rolling shutter method, determine whether the IR image is saturated based on two or more frames corresponding to a phase of about 0 degrees.

According to an aspect of another exemplary embodiment, there is provided a method of generating a 3D IR image including: emitting an IR signal; receiving the reflected IR signal, the reflected IR signal corresponding to the IR signal being reflected from an object; and generating an IR image based on the reflected signal, determining whether the IR image is saturated based on comparison between at least one pixel value of the IR image and a reference pixel value, and controlling an intensity of the IR signal emitted by the light source based on a result of the determination.

The controlling the intensity of the IR signal may include: setting the reference pixel value; and determining that the IR image is saturated, when the at least one pixel value of the IR image is greater than the reference pixel value.

The controlling the intensity of the IR signal may include, in response to determining that the IR image is saturated, gradually reducing or increasing the intensity of the IR signal up to a maximum intensity at which the IR image is unsaturated.

The controlling the intensity of the IR signal may include, in response to determining that the IR image is saturated, reducing the intensity of the IR signal to a lowest level and gradually increasing the intensity of the IR signal up to a maximum intensity at which the IR image is unsaturated.

The controlling the intensity of the IR signal may include, in response to determining that the IR image is saturated, reducing the intensity of the IR signal to a lowest level and determining an optimal intensity of the IR signal based on a saturation degree of the IR image.

The emitting the IR signal may include emitting four IR signals having different phases, the four IR signals being reflected from the object, and the controlling the intensity of the IR signal may include determining whether the IR image is saturated based on at least one of the reflected four IR signals.

The 3D IR image is generated by a camera using a global shutter method, and the controlling the intensity of the light source may include determining whether the IR image is saturated based on a frame corresponding to a phase of about 0 degrees.

When the 3D IR image is generated by a camera using a rolling shutter method, the controlling the intensity of the IR signal may include determining whether the IR image is saturated based on two or more frames corresponding to a phase of about 0 degrees.

According to an aspect of another exemplary embodiment, there is provided a non-transitory computer-readable storage medium storing a program that is executed by a computer to perform the method.

According to an aspect of another exemplary embodiment, there is provided an electronic device for recognizing a location of an object including: a light source configured to emit a first signal, the signal being reflected from the object; a light receiver configured to detect the reflected first signal; and a processor configured to generate an image including depth information of the object based on the reflected first signal, determine a degree of saturation of the image based on comparison between at least one pixel value of the image and a reference pixel value, and set an intensity level of a second signal to be emitted from the light source based on the degree of saturation.

The reference pixel value may include a saturation reference pixel value, and the processor may be further configured to count a number of pixels in the image which have a value greater than the saturation reference pixel value, determine whether the counted number is greater than a saturation threshold number, and control the light source to decrease an intensity level set for the first signal in response to determining that the counted number is greater than the saturation threshold number.

The reference pixel value may include an unsaturation reference pixel value, and the processor may be further configured to count a number of pixels in the image which have a value less than the unsaturation reference pixel value, determine whether the counted number is less than a unsaturation threshold number, and control the light source to increase an intensity level set for the first signal in response to determining that the counted number is less than the unsaturation threshold number.

BRIEF DESCRIPTION OF THE DRAWINGS

The above and/or other aspects will be more apparent by describing certain exemplary embodiments, with reference to the accompanying drawings, in which.

DETAILED DESCRIPTION

Figure 1:
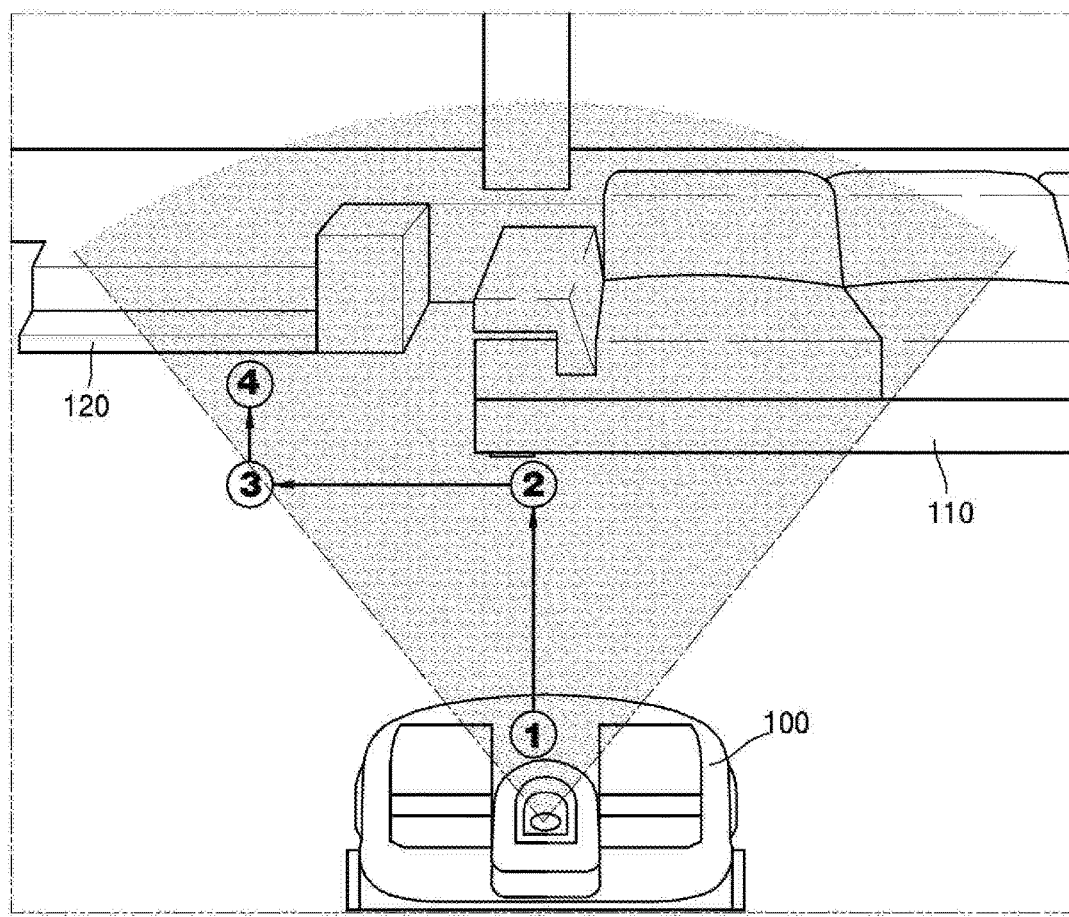
FIG. 1 is a diagram for describing a situation in which a device operates.

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail.

Expressions such as "at least one of" when preceding a list of elements, modify the entire list of elements and do not modify the individual elements of the list.

FIG. 1 is a diagram for describing a situation in which a device 100 operates. FIG. 1 illustrates a moving direction of the device 100. The device 100 may capture and generate an infrared (IR) image while moving. The device 100 may emit an IR signal and generate an IR image by using a received IR signal. The device 100 may capture and generate IR images at regular intervals.

A different IR image may be generated when a position of the device 100 is changed. For example, when the distance from the device 100 to a target object changes, the device 100 generates a new IR image different from a previous IR image captured by the device 100 before the distance changes. The new IR image may contain depth information different from depth information included in the previous IR image. The device 100 may adjust the light intensity of a light that is emitted so as to generate the IR image. For example, a distance between the device 100 and a sofa 110 is changed when the position of the device 100 is changed from a position ① to a position ②. Therefore, even when the intensity of the light emitted from the device 100 at the position ① is the same as the intensity of the light emitted from the device 100 at the position ②, different IR images may be generated. In this case, the IR image generated when the device 100 is located at the position ② may be saturated. In addition, since a distance between the device 100 and stairs 120 is changed when the device 100 is located at a position ③ and when the device 100 is located at a position ④, the device 100 may need to change the intensity of the light so as to determine a position of the stairs 120.

In a case where the device 100 moves, the device 100 may adjust the emission intensity of the light source. For example, as illustrated in FIG. 1, the device 100 may sequentially move from the position ① to the position ②, from the position ② to the position ③, and from the position ③ to the position ④. The device 100 may determine an optimal light intensity of the light source when the device 100 moves from one position to another, and acquire an IR image by emitting light at the optimal light intensity of the light source. By acquiring an unsaturated IR image, the device 100 may determine positions of surrounding objects, namely, the sofa 110 and the stairs 120 and move without colliding with the surrounding objects 110 and 120.

The device 100 may be an electronic device including a camera. Alternatively, the device 100 may be an electronic device capable of image processing. For example, the device 100 may be a robot cleaner, a drone, a mobile phone, or a TV. In addition, the device 100 may be movable. When the device 100 moves, objects located in front of the device 100 may be changed, or a distance between the object and the device 100 may be changed. Therefore, the device 100 may generate images at regular intervals. Since a robot cleaner moves while changing the position thereof, the robot cleaner may collide with an object during movement. Therefore, it is important to accurately determine the position of the object.

The device 100 may determine the light intensity of the light source at a fast speed. The device 100 may output signals having a plurality of phases and generate an IR image based on received signals. The device 100 may determine the light intensity of the light source by using part of the signals having the plurality of phases. The device 100 may determine saturation or unsaturation of the IR image by using the part of the signals and control the light intensity of the light source based on a determination result. A method for determining saturation or unsaturation will be described in detail with reference to FIGS. 10 to 14.

The device 100 may generate an IR image by using signals having a phase of 0 degrees and determine whether the generated IR image is saturated. When the device 100 determines that the generated IR image is saturated, the device 100 may reduce the light intensity of the light source. When the device 100 determines that the generated IR image is unsaturated, the device 100 may increase the light intensity of the light source. A method for determining the saturation or unsaturation of the IR image will be described in detail with reference to FIGS. 7 to 9.

Figure 2:
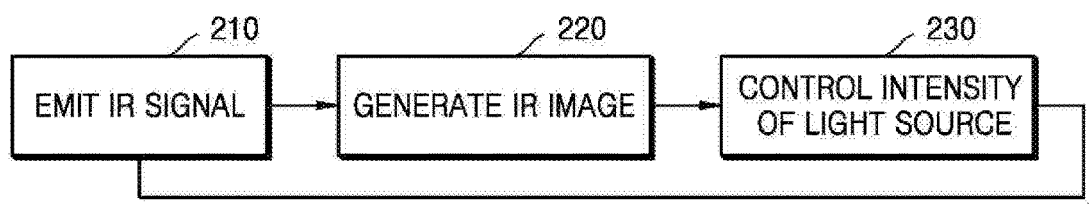
FIG. 2 is a diagram for describing a method of generating an IR image, according to an exemplary embodiment.

FIG. 2 is a diagram for describing a method of generating an IR image, according to an exemplary embodiment.

In operation 210, the device 100 may emit an IR signal. The intensity of the IR signal may be adjusted to be one of a plurality of levels. The device 100 may control the intensity of the IR signal that ranges from a first level to N level. N is a natural number greater than or equal to 2. For example, the device 100 may emit or output an initial IR signal at the highest intensity.

In operation 220, the device 100 may generate an IR image by using a reflected signal. The IR signal output from the device 100 may be reflected from an object and be returned to the device 100. The IR signal returned to the device 100 will be referred to as the reflected signal.

In operation 230, the device 100 may control the light intensity of the light source based on the IR image. The device 100 may determine whether the IR image is saturated. When it is determined that the IR image is saturated, the device 100 may reduce the light intensity of the light source. When it is determined that the IR image is unsaturated, the device 100 may increase the light intensity of the light source. After the light intensity of the light source is adjusted, the device 100 may return to operation 210 to emit an IR signal at the adjusted light intensity of the light source.

The device 100 may repeat operations 210 to 230. If the device 100 moves, the IR image generated by the device 100 may be continuously changed. Therefore, the device 100 may continuously control the light intensity of the light source according to the changed IR image.

Figure 3:
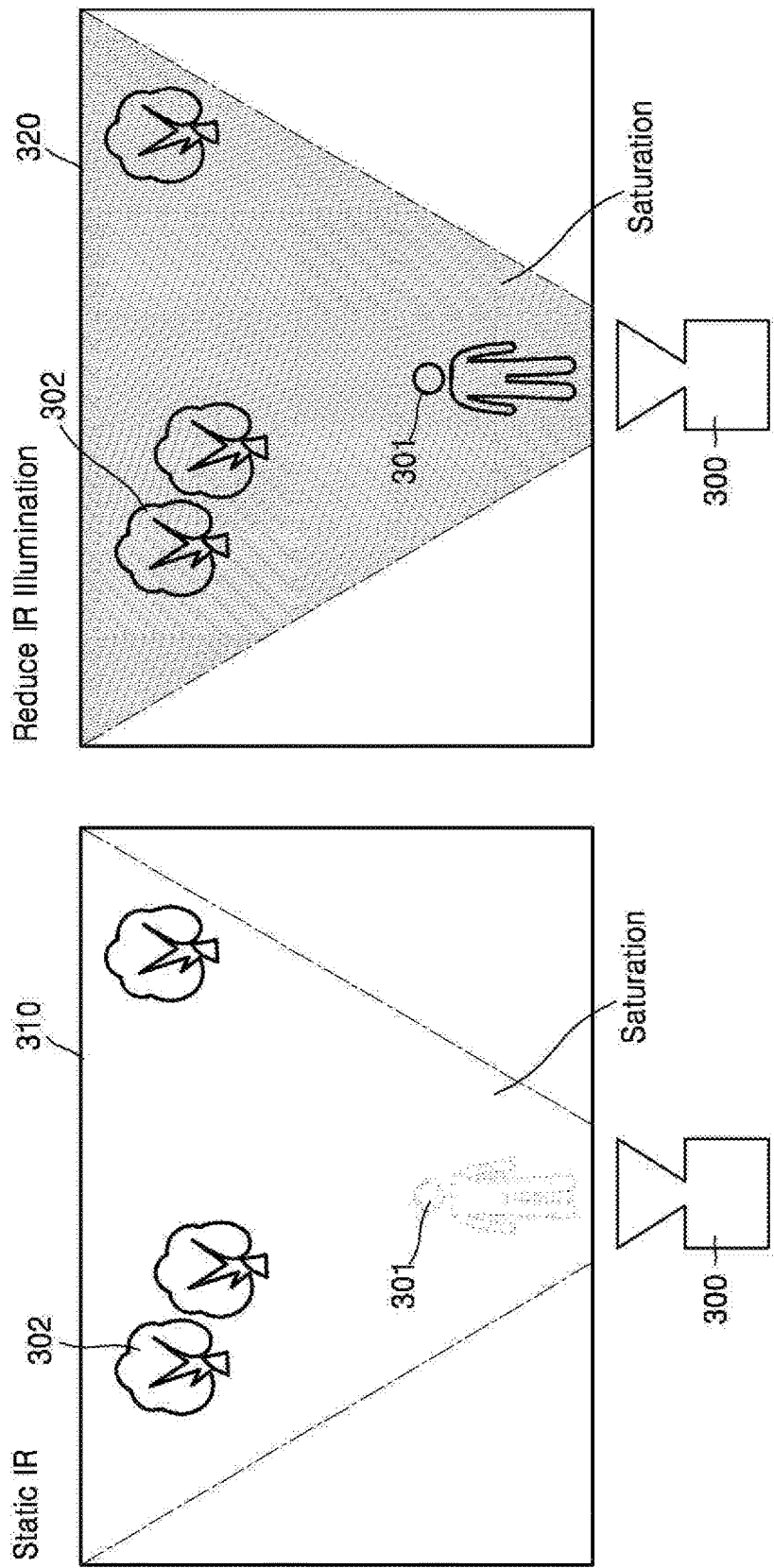
FIG. 3 is a diagram for describing a high dynamic range image.

FIG. 3 is a diagram for describing a high dynamic range image. Referring to FIG. 3, a first image 310 is a saturated image in which a first object 301 is not identified, and a second image 320 is an unsaturated image in which the first object 301 is identified. In the first image 310, the first object 301 is not identified. In a case where a camera 300 emits a large amount of light, an image of the first object 301 close to the camera 300 may be saturated. Therefore, the camera 300 may generate the second image 320 by reducing the light intensity of the light source. The second image 320 may be an image generated by emitting a smaller amount of light than by the generation of the first image 31. Therefore, in the second image 320, the image of the first object 301 is unsaturated. However, if the light intensity of the light source is reduced so as to identify the first object 301, a second object 302 may not be identified. Since the second object 302 is farther away from the camera 300 than the first object 301, the light intensity of the light source cannot be reduced to the minimum level so as to generate an image capable of identifying the second object 302. Therefore, it is necessary to determine the light intensity of the light source at which both the first object 301 and the second object 302 are identified.

The camera 300 according to the present exemplary embodiment may determine the light intensity of the light source at which both the first object 301 and the second object 302 are identified. When the image is saturated and thus the first object 301 is not identified, the camera 300 may reduce the light intensity of the light source, acquire an image again, and determine the saturation or unsaturation of the image. The camera 300 may quickly update the light intensity of the light source by determining the saturation or unsaturation of the image by using only one of the signals having a plurality of phases.

Figure 4:
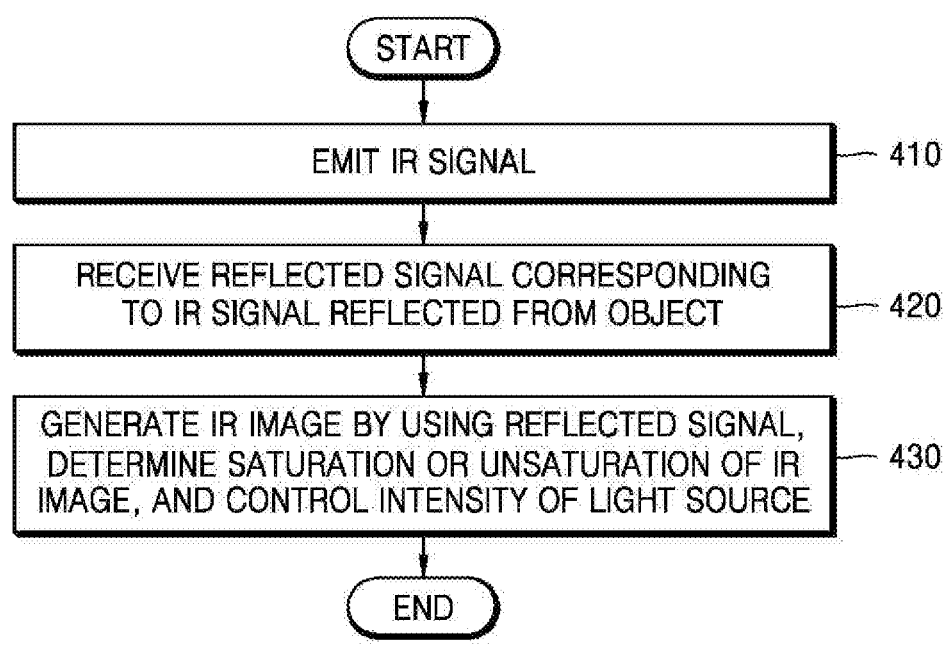
FIG. 4 is a flowchart of a method of generating an IR image, according to an exemplary embodiment.

FIG. 4 is a flowchart of a method of generating an IR image, according to an exemplary embodiment. Referring to FIG. 4, the camera 300 may control the light intensity of the light source base on the saturation or unsaturation of the IR image.

In operation 410, the camera 300 may emit an IR signal. The camera 300 may include a diode that emits the IR signal. The camera 300 may control the intensity of the IR signal by controlling a magnitude of a voltage applied to the diode or an amount of a current flowing through the diode. The camera 300 may emit IR signals having a plurality of phases. For example, the camera 300 may emit IR signals having phases of 0 degrees, 90 degrees, 180 degrees, and 270 degrees.

In operation 420, the camera 300 may receive reflected signals, i.e., the IR signals reflected from the object.

In operation 430, the camera 300 may generate an IR image by using the reflected signals, determine the saturation or unsaturation of the IR image, and control the light intensity of the light source. The camera 300 may determine whether the IR image is saturated. For example, the camera 300 may determine a pixel as a saturated pixel when a pixel value thereof in the IR image is greater than a first threshold value, and determine that the IR image is saturated when the number of saturated pixels is greater than a second threshold value. The camera 300 may reduce the light intensity of the light source when it is determined that the IR image is saturated, and may increase the light intensity of the light source when it is determined that the IR image is unsaturated.

Figure 5:
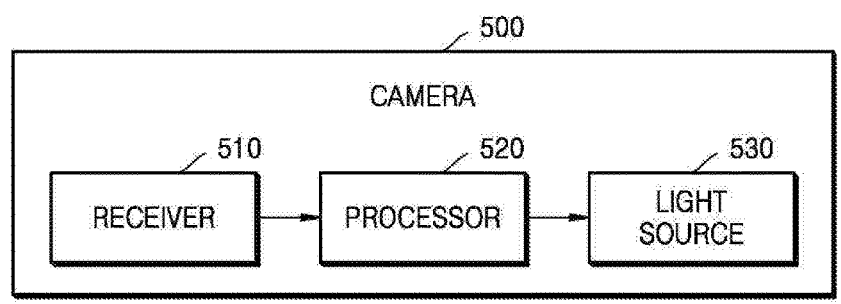
FIG. 5 is a configuration diagram of a camera according to an exemplary embodiment.

FIG. 5 is a configuration diagram of a camera 500 according to an exemplary embodiment. Referring to FIG. 5, the camera 500 may include a receiver 510, a processor 520, and a light source 530.

The light source 530 may emit light. For example, the light source 530 may output an IR signal, an ultraviolet (UV) signal, or the like to the receiver. The emitted light may be reflected from an object located around the camera 500.

The receiver 510 may receive a signal carried by the light reflected from the object.

The processor 520 may receive the signal from the receiver 510 and generate an image based on the signal. For example, the processor 520 may generate an IR image based on the IR signal.

The processor 520 may set a reference pixel value for determining the saturation or unsaturation of the IR image. When pixel values of some of all pixels of the IR image are greater than the reference pixel value, the processor 420 may determine that the IR image is saturated. The processor 520 may count the number of saturated pixels, which have pixel values that are greater than the reference pixel value. When the number of saturated pixels is greater than a certain threshold value, the processor 520 may determine that the IR image is saturated.

The processor 520 may control the light source 530. For example, the processor 520 may gradually reduce or increase the light intensity of the light source 530 up to a maximum light intensity at which the IR image is unsaturated. The processor 520 may reduce the light intensity of the light source 530 when it is determined that the IR image is saturated, and may increase the intensity of the light source 530 when it is determined that the IR image is unsaturated. The light intensity of the light source 530 may be adjusted to be one of a plurality of levels. For example, the light intensity of the light source 530 may range from a first level to a fourth level. The processor 520 may gradually increase the light intensity of the light source 530 from the first level to the fourth level, or may gradually reduce the light intensity of the light source 530 from the fourth level to the first level. Details will be described below with reference to FIG. 7.

As another example, when it is determined that the IR image is saturated, the processor 520 may reduce the light intensity of the light source 530 to the lowest level and gradually increase the light intensity of the light source 530 up to the maximum light intensity at which the IR image is unsaturated. For example, when the IR image is saturated when the light intensity of the light source 530 is at the fourth level, the processor 520 may reduce the light intensity of the light source 530 to the first level, generate an IR image, and determine whether the IR image is saturated. When the IR image is unsaturated when the light intensity of the light source 530 is at the first level, the processor 520 may gradually increase the light intensity of the light source 530 and determine whether the IR image is saturated. Details will be described below with reference to FIG. 8.

As another example, when it is determined that the IR image is saturated, the processor 520 may reduce the light intensity of the light source 530 to the lowest level and determine an optimal light intensity of the light source 530 based on a saturation degree of the IR image. The processor 520 may determine the light intensity of the light source 5230 based on the number of saturated pixels in the IR image. Details will be described below with reference to FIG. 9.

The light source 530 may emit four IR signals having different phases. The processor 520 may determine the saturation or unsaturation of the generated image by using at least one of the four phases. For example, the light source 530 may emit IR signals having phases of 0 degrees, 90 degrees, 180 degrees, and 270 degrees. The processor 520 may generate an image by using reflected signals having four phases, but may determine the saturation or unsaturation of the image by using one signal of the four reflected signals.

For example, in a case where the camera 500 is a camera using a global shutter method, the processor 520 may determine the saturation or unsaturation of the generated image by using a frame corresponding to a phase of 0 degrees.

As another example, in a case where the camera 500 is a camera using a rolling shutter method, the processor 520 may determine the saturation or unsaturation of the generated image by using two or more frames corresponding to a phase of 0 degrees. In the case of the rolling shutter method, a light source phase and a frame may not match each other. Therefore, a plurality of frames may be needed for generating an image corresponding to one light source phase.

Figure 6:
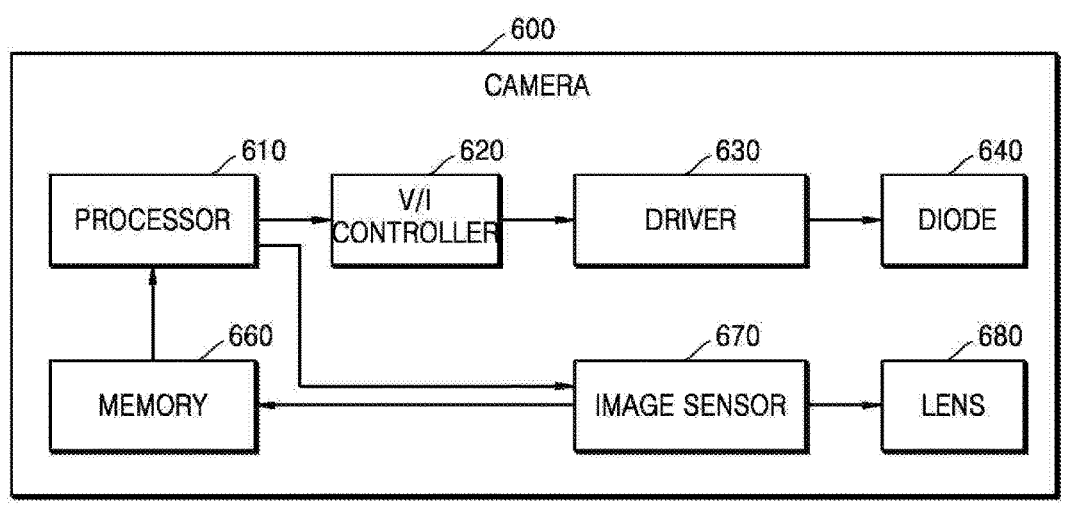
FIG. 6 is a configuration diagram of a camera according to another exemplary embodiment.

FIG. 6 is a configuration diagram of a camera 600 according to another exemplary embodiment. The camera 600 may include a processor 610, a voltage/current (V/I) controller 620, a driver 630, a diode 640, a memory 660, an image sensor 670, and a lens 680. The image sensor 670 and the lens 680 may be included in the receiver 510 of FIG. 5. The V/I controller 620, the driver 630, and the diode 640 may be included in the light source 530 of FIG. 5.

The processor 610 may output a signal to the V/I controller 620 so as to control a magnitude of a voltage or a current output by the V/I controller 620. As described above with reference to FIG. 5, the processor 610 may determine whether to increase or reduce the magnitude of the voltage or the current output by the V/I controller 620 according to the saturation or unsaturation of the IR image.

The V/I controller 620 may output the voltage or the current. The V/I controller 620 may output the voltage or the current, which is determined by the processor 610, to the driver 630.

The driver 630 may control the diode 640 according to the voltage or the current received from the V/I controller 620.

The diode 640 may include a plurality of light-emitting elements and emit light. The diode 640 may emit IR signals having a plurality of phases.

The lens 680 may refract received light. Light passing through the lens 680 may reach the image sensor 670.

The image sensor 670 may convert light passing through the lens 680 into an electrical signal. The image sensor 670 may output the electrical signal to the memory 660. The image sensor 670 may output IR signals having a plurality of phases to the memory 660.

The memory 660 may store data received from the image sensor 670. The memory 660 may receive and store signals corresponding to the plurality of phases from the image sensor 670.

The processor 610 may read data stored in the memory 660. The processor 610 may read only some of data stored in the memory 660. For example, in a case where pieces of image data of four phases are stored in the memory 660, the processor 610 may read only one piece of data from the memory 660.

Figure 7:
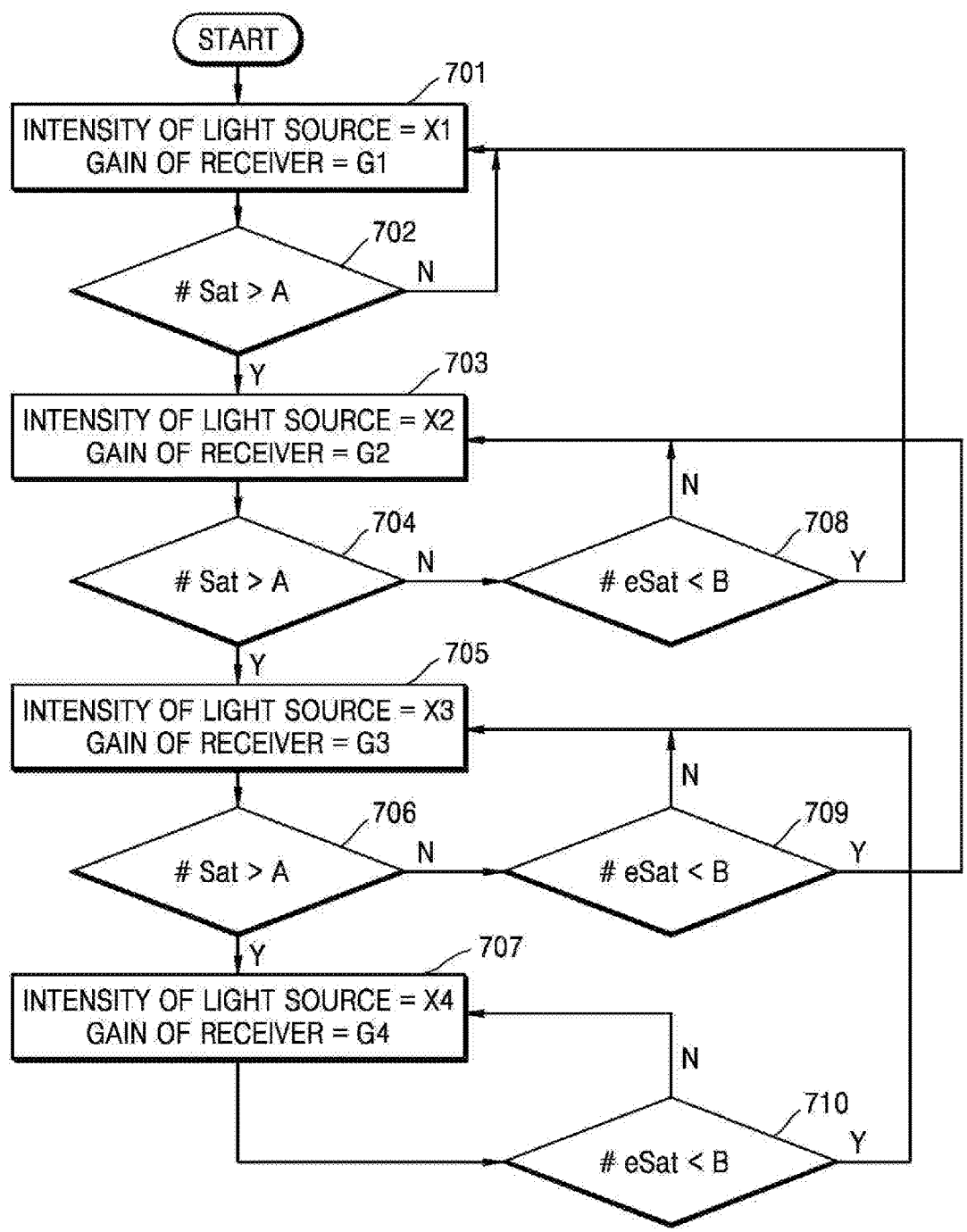
FIG. 7 is a flowchart of a method of adjusting light intensity of a light source, according to an exemplary embodiment.

FIG. 7 is a flowchart of a method of adjusting the light intensity of the light source 530, according to an exemplary embodiment. Referring to FIG. 7, the processor 610 may gradually reduce or increase the light intensity of the light source 530 up to a maximum light intensity at which the IR image is unsaturated. In other words, the processor 610 may output a signal designating the magnitude of the voltage or the current to the V/I controller 620 according to the saturation or unsaturation of the IR image.

In operation 701, the processor 610 may set the light intensity of the light source 530 to X1 and set a gain of the receiver 510 to G1. The processor 610 may determine the magnitude of the voltage or the current output by the V/I controller 620 and set the light intensity of the light source 530. For example, the light source 530 may have four levels of light intensity X1 to X4. The light source 530 may have four or more levels or less than four levels of light intensity. X1 represents the highest level of the light intensity of the light source 530, and X4 represents the lowest level of the light intensity of the light source 530. In other words, the light intensity of the light source 530 gradually decreases in the order from X1 to X4.

The processor 610 may set the gain of the receiver 510 to G1. For example, the processor 610 may set gains of amplifiers included in the image sensor 670 to G1. G1 represents the highest level of the gain of the receiver 510, and G4 represents the lowest level of the gain of the receiver 510. The gain of the receiver 510 gradually decreases in the order from G1 to G4.

In operation 702, the processor 610 may determine whether the number of saturated pixels among pixels of a first image is greater than A. A may be any natural number and may be a value less than the number of pixels included in one image. The saturated pixel may be a pixel having a pixel value that is greater than a saturation threshold value.

The processor 610 may set and change a reference threshold value. # Sat may represent the number of saturated pixels. When the number of saturated pixels is greater than A, the light intensity of the light source 530 is high. Therefore, the processor 610 may proceed to operation 703 so as to adjust the light intensity of the light source 530. When the number of saturated pixels is less than or equal to A, the processor 610 may determine that the image is unsaturated and return to operation 701.

The first image may be an image acquired when the light intensity of the light source 530 is X1 and the gain of the receiver 510 is G1. For example, the light source 530 may output an IR signal which has an intensity that is X1, and the receiver 510 may receive a reflected signal and amplify the reflected signal by G1. The processor 610 may generate a first image based on the reflected signal received from the receiver 510. In operation 703, the processor 610 may set the light intensity of the light source 530 to X2 and set the gain of the receiver 510 to G2. Since it is determined that the image is saturated, the processor 610 may reduce both or either of the light intensity of the light source 530 and the gain of the receiver 510.

In operation 704, the processor 610 may determine whether the number of saturated pixels among pixels of the second image is greater than A. The second image may be an image acquired when the light intensity of the light source 530 is X2 and the gain of the receiver 510 is G2. In other words, the processor 610 may generate the second image based on a reflected signal acquired in a state in which the light intensity of the light source 530 or the gain of the receiver 510 is reduced, and determine whether the number of saturated pixels in the second image is greater than A.

When the number of saturated pixels is greater than A, the light intensity of the light source 530 is high. Therefore, the processor 610 may proceed to operation 705 so as to adjust the light intensity of the light source 530. When the number of saturated pixels is less than or equal to A, the processor 610 may determine that the image is unsaturated and proceed to operation 708.

In operation 705, the processor 610 may set the light intensity of the light source 530 to X3 and set the gain of the receiver 510 to G3.

In operation 706, the processor 610 may determine whether the number of saturated pixels among pixels of the third image is greater than A. The second image may be an image acquired when the light intensity of the light source 530 is X2 and the gain of the receiver 510 is G3.

When the number of saturated pixels is greater than A, the light intensity of the light source 530 is high. Therefore, the processor 610 may proceed to operation 707 so as to adjust the light intensity of the light source 530. When the number of saturated pixels is less than or equal to A, the processor 610 may determine that the image is unsaturated and proceed to operation 709.

In operation 707, the processor 610 may set the light intensity of the light source 530 to X4 and set the gain of the receiver 510 to G4.

In operation 708, the processor 610 may determine whether the number of unsaturated pixels among the pixels of the second image is less than B. B may be any natural number and may be 0. For example, when B is set to 0, the processor 610 may determine in operation 708 whether there are no unsaturated pixels. B may be a threshold value for determining the second image as the unsaturated image. # eSat may represent the number of unsaturated pixels. The unsaturated pixel may be a pixel having a pixel value that is less than an unsaturation threshold value. The processor 610 may determine the product of the saturation threshold value and e as the unsaturation threshold value. e may be greater than 0 and less than 1. For example, when the saturation threshold value is 1,000 and e is 0.2, the unsaturation threshold value is 200. Therefore, # eSat represents the number of pixels which have pixel values that are less than 200.

When the number of unsaturated pixels is less than B, the processor 610 may proceed to operation 701 so as to adjust the light intensity of the light source 530. When the number of unsaturated pixels is greater than or equal to B, the processor 610 may proceed to operation 703.

In operation 709, the processor 610 may determine whether the number of unsaturated pixels among the pixels of the third image is less than B. When the number of unsaturated pixels in the third image is less than B, the processor 610 may proceed to operation 703 so as to adjust the light intensity of the light source 530. When the number of unsaturated pixels is greater than or equal to B, the processor 610 may proceed to operation 705.

In operation 710, the processor 610 may determine whether the number of unsaturated pixels among the pixels of the fourth image is less than B. When the number of unsaturated pixels in the fourth image is less than B, the processor 610 may proceed to operation 705 so as to adjust the light intensity of the light source 530. When the number of unsaturated pixels is greater than or equal to B, the processor 610 may proceed to operation 707.

Figure 8:
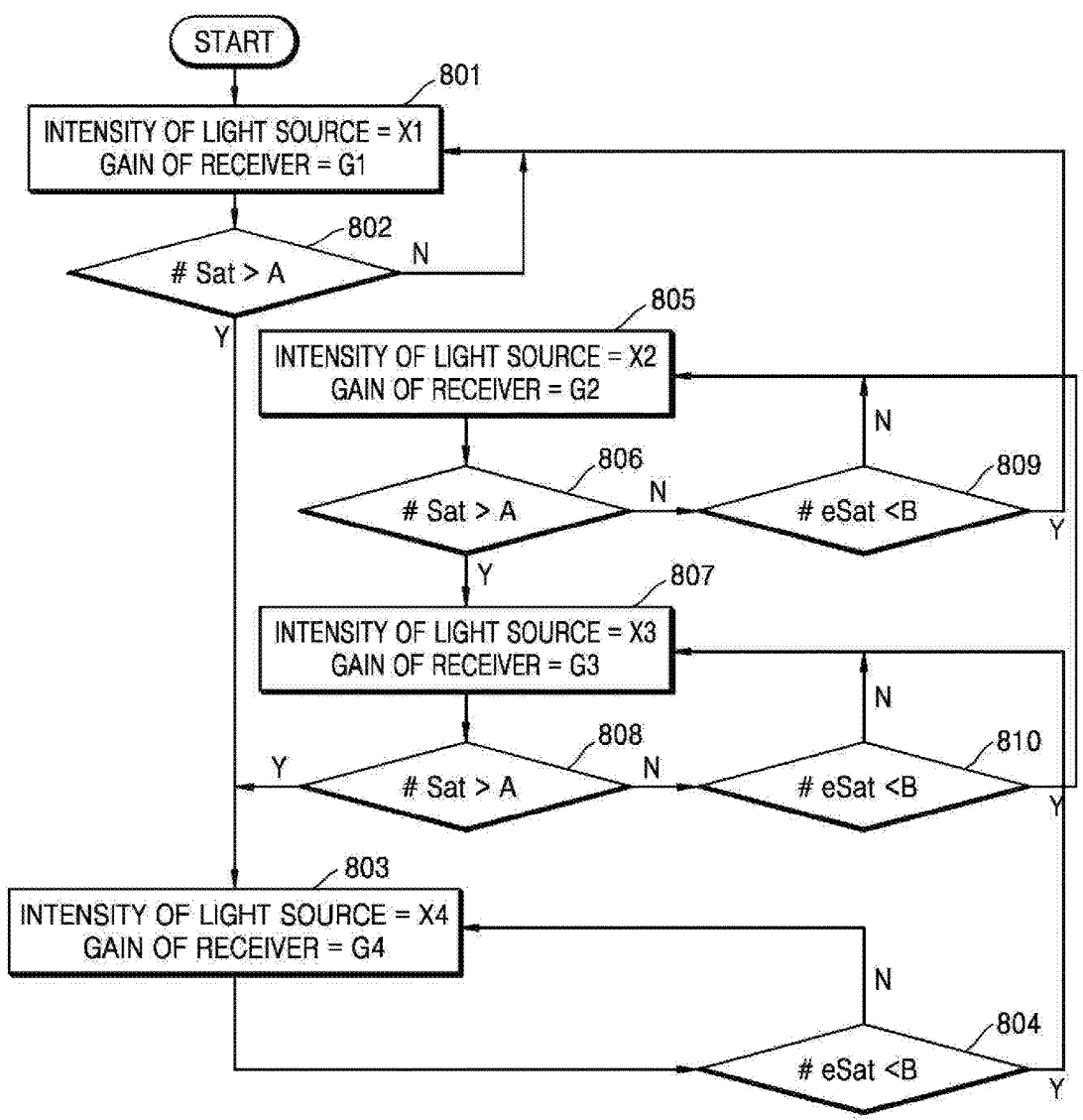
FIG. 8 is a flowchart of a method of adjusting light intensity of a light source, according to another exemplary embodiment.

FIG. 8 is a flowchart of a method of adjusting the light intensity of the light source 530, according to another exemplary embodiment. Referring to FIG. 8, the processor 610 may reduce the light intensity of the light source 530 to the lowest level and gradually increase the light intensity of the light source 530 up to the maximum light intensity at which the IR image is unsaturated.

In operation 801, the processor 610 may set the light intensity of the light source 530 to X1 and set the gain of the receiver 510 to G1.

In operation 802, the processor 610 may determine whether the number of saturated pixels among the pixels of the first image is greater than A. When the number of saturated pixels is greater than A, the processor 610 may proceed to operation 803 so as to reduce the light intensity of the light source 530 to the lowest level. When the number of saturated pixels is less than or equal to A, the processor 610 may determine that the image is unsaturated and proceed to operation 801.

In operation 803, the processor 610 may set the light intensity of the light source 530 to X4 and set the gain of the receiver 510 to G4.

In operation 804, the processor 610 may determine whether the number of unsaturated pixels among the pixels of the fourth image is less than B. When the number of unsaturated pixels is less than B, the processor 610 may proceed to operation 807 so as to adjust the light intensity of the light source 530. When the number of unsaturated pixels is greater than or equal to B, the processor 610 may proceed to operation 803.

In operation 805, the processor 610 may set the light intensity of the light source 530 to X2 and set the gain of the receiver 510 to G2.

In operation 806, the processor 610 may determine whether the number of saturated pixels among the pixels of the second image is greater than A. When the number of saturated pixels is greater than A, the processor 610 may proceed to operation 807 so as to reduce the light intensity of the light source 530. When the number of saturated pixels is less than or equal to A, the processor 610 may determine that the image is unsaturated and proceed to operation 809.

In operation 807, the processor 610 may set the light intensity of the light source 530 to X3 and set the gain of the receiver 510 to G3.

In operation 808, the processor 610 may determine whether the number of saturated pixels among the pixels of the third image is greater than A. When the number of saturated pixels is greater than A, the processor 610 may proceed to operation 803 so as to reduce the light intensity of the light source 530. When the number of saturated pixels is less than or equal to A, the processor 610 may determine that the image is unsaturated and proceed to operation 810.

In operation 809, the processor 610 may determine whether the number of unsaturated pixels among the pixels of the second image is less than B. When the number of unsaturated pixels is less than B, the processor 610 may proceed to operation 801 so as to adjust the light intensity of the light source 530. When the number of unsaturated pixels is greater than or equal to B, the processor 610 may proceed to operation 805.

In operation 810, the processor 610 may determine whether the number of unsaturated pixels among the pixels of the third image is less than B. When the number of unsaturated pixels is less than B, the processor 610 may proceed to operation 805 so as to adjust the light intensity of the light source 530. When the number of unsaturated pixels is greater than or equal to B, the processor 610 may proceed to operation 807.

Figure 9:
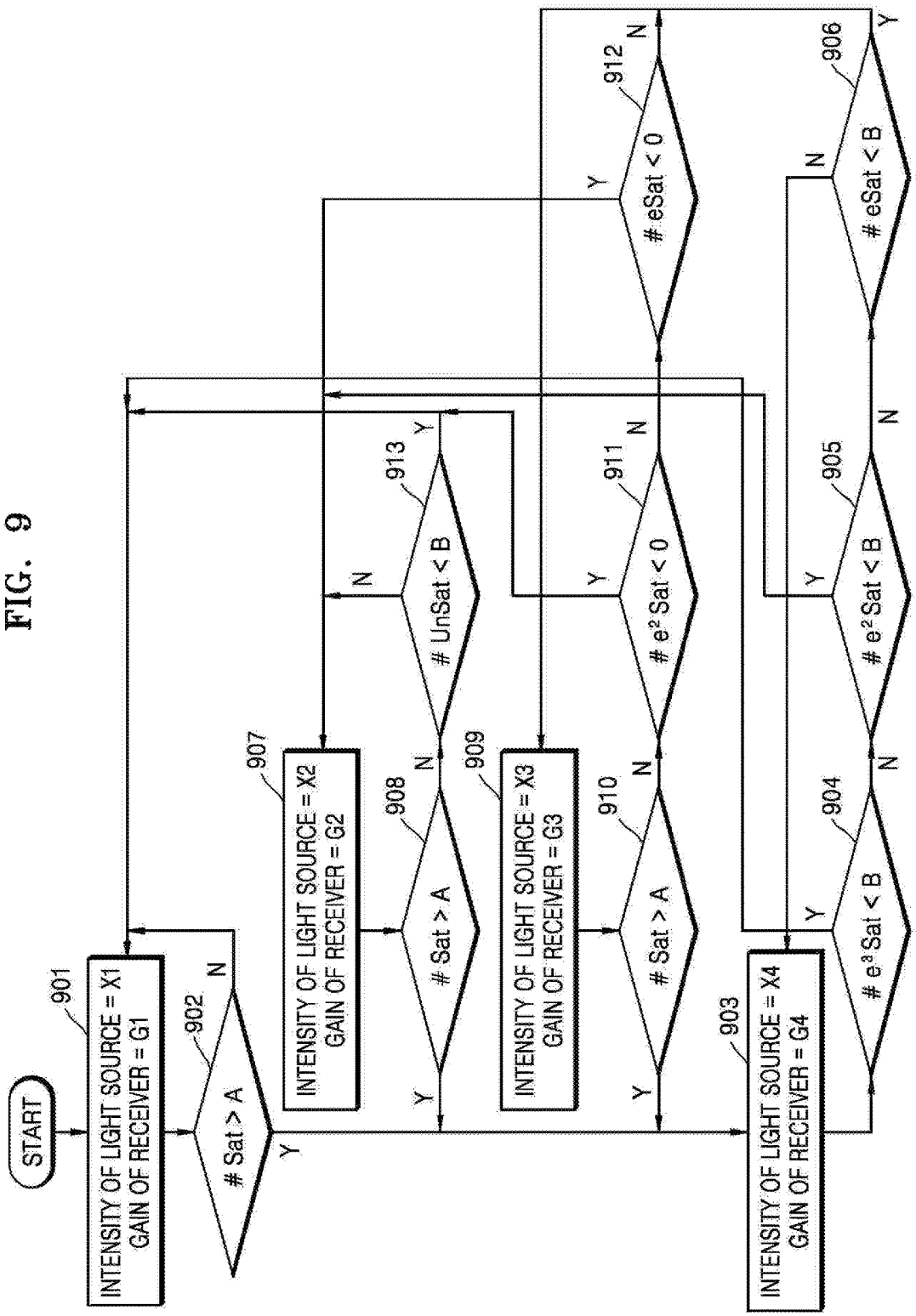
FIG. 9 is a flowchart of a method of adjusting intensity of a light source, according to another exemplary embodiment.

FIG. 9 is a flowchart of a method of adjusting the light intensity of the light source 850, according to another exemplary embodiment. Referring to FIG. 9, when it is determined that the IR image is saturated, the processor 610 may reduce the light intensity of the light source 530 to the lowest level and determine an optimal light intensity of the light source 530 based on a saturation degree of the IR image.

In operation 901, the processor 610 may set the light intensity of the light source 530 to X1 and set the gain of the receiver 510 to G1.

In operation 902, the processor 610 may determine whether the number of saturated pixels among the pixels of the first image is greater than A. When the number of saturated pixels is greater than A, the processor 610 may proceed to operation 903 so as to reduce the light intensity of the light source 530 to the lowest level. When the number of saturated pixels is less than A, the processor 610 may determine that the image is unsaturated and proceed to operation 901.

In operation 903, the processor 610 may set the light intensity of the light source 530 to X4 and set the gain of the receiver 510 to G4.

In operation 904, the processor 610 may determine whether the number of unsaturated pixels among the pixels of the fourth image is less than B. A third unsaturation threshold value for determining the unsaturated pixel in operation 904 may be $e^3$ times the saturation threshold value. In other words, the processor 610 may determine whether the number of pixels, which have pixel values that are less than the third unsaturated threshold value in the fourth image, is less than B.

The first unsaturation threshold value may be e times the saturation threshold value, the second unsaturation threshold value may be $e^2$ times the saturation threshold value, and the third unsaturation threshold value may be $e^3$ times the saturation threshold value. # $e^3$Sat may represent the number of pixels, which have pixel values that are less than the third unsaturation threshold value, # $e^2$Sat may represent the number of pixels, which have pixel values that are less than the second unsaturation threshold value, and # eSat may represent the number of pixels, which have pixel values that are less than the first unsaturation threshold value.

When the number of unsaturated pixels is determined as being less than B in operation 904, the processor 610 may proceed to operation 901 so as to adjust the light intensity of the light source 530. When the number of unsaturated pixels is determined as being greater than or equal to B in operation 904, the processor 610 may proceed to operation 905.

In operation 905, the processor 610 may determine whether the number of unsaturated pixels among the pixels of the fourth image is less than B. The second unsaturation threshold value for determining the unsaturated pixel in operation 905 may be $e^2$ times the saturation threshold value. In other words, the processor 610 may determine whether the number of pixels, which have pixel values that are less than the second unsaturated threshold value in the fourth image, is less than B.

When the number of unsaturated pixels is less than B, the processor 610 may proceed to operation 907 so as to adjust the light intensity of the light source 530. When the number of unsaturated pixels is greater than or equal to B, the processor 610 may proceed to operation 906.

In operation 906, the processor 610 may determine whether the number of unsaturated pixels among the pixels of the fourth image is less than B. The first unsaturation threshold value for determining the unsaturated pixel in operation 906 may be e times the saturation threshold value. In other words, the processor 610 may determine whether the number of pixels, which have pixel values that are less than the first unsaturated threshold value in the fourth image, is less than B.

When the number of unsaturated pixels is less than B, the processor 610 may proceed to operation 909 so as to adjust the light intensity of the light source 530. When the number of unsaturated pixels is greater than or equal to B, the processor 610 may proceed to operation 903.

A case where an image capturing method is a global shutter method will be described with reference to FIGS. 10 and 11.

A case where an image capturing method is a rolling shutter method will be described with reference to FIGS. 12 and 13.

Figure 10:
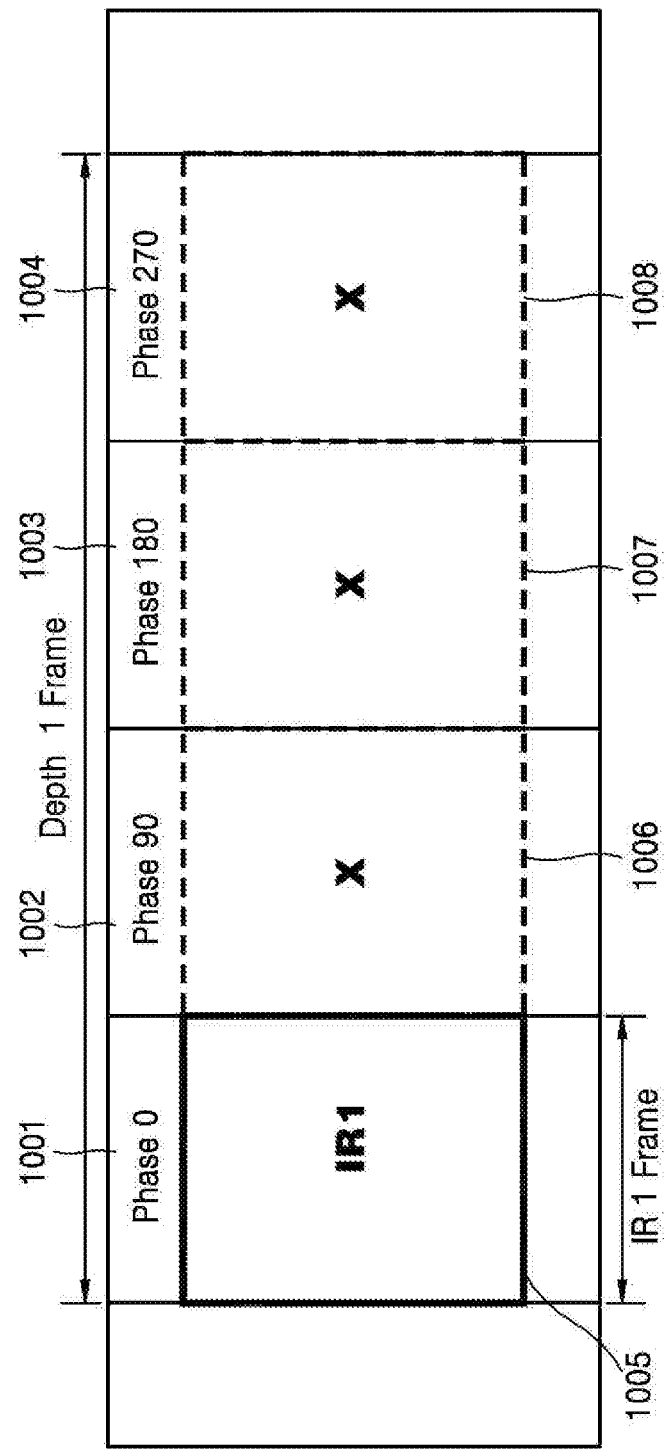
FIG. 10 is a diagram for describing a method of determining a saturated image, according to an exemplary embodiment.

FIG. 10 is a diagram for describing a method of determining a saturated image, according to an exemplary embodiment. Referring to FIG. 10, the processor 610 may determine saturation or unsaturation of an image by using one IR frame.

Four light source phases 1001 to 1004 represent phases of IR signals that the light source 530 outputs. The light source phase 1001 represents a light source phase of 0 degrees, the light source phase 1002 represents a light source phase of 90 degrees, the light source phase 1003 represents a light source phase of 180 degrees, and the light source phase 1004 represents a light source phase of 270 degrees.

The receiver 510 may receive four IR frames 1005 to 1008.

The processor 610 may determine the saturation or unsaturation of the IR image by using one IR frame 1005 among the four IR frames 1005 to 1008. Since the saturation of the IR image is caused by an object located at a short distance from the camera, it is possible to determine the saturation or unsaturation of the IR image by using only the IR frame 1005 having a phase of 0 degrees. Since the intensity of the reflected signal received by the image sensor 670 is the product of the power of the light source 530 and the intensity of the ideal IR signal according to the distance, the magnitude of the reflected signal having a phase of 0 degrees is relatively greater than the magnitude of the reflected signal having a different phase. Therefore, the processor 610 may determine the saturation or unsaturation of the IR image by monitoring the reflected signal having a phase of 0 degrees. However, the exemplary embodiment is not limited thereto, and the processor 610 may determine whether the IR image is saturated based on two or more IR frames. Further, when the processor 610 determines the saturation based on a single IR frame, the IR frame may be the frame 1006 having the 90 degree phase shift, the frame 1007 having the 180 degree phase shift, or the frame 1008 having the 270 degree phase shift.

Figure 11:
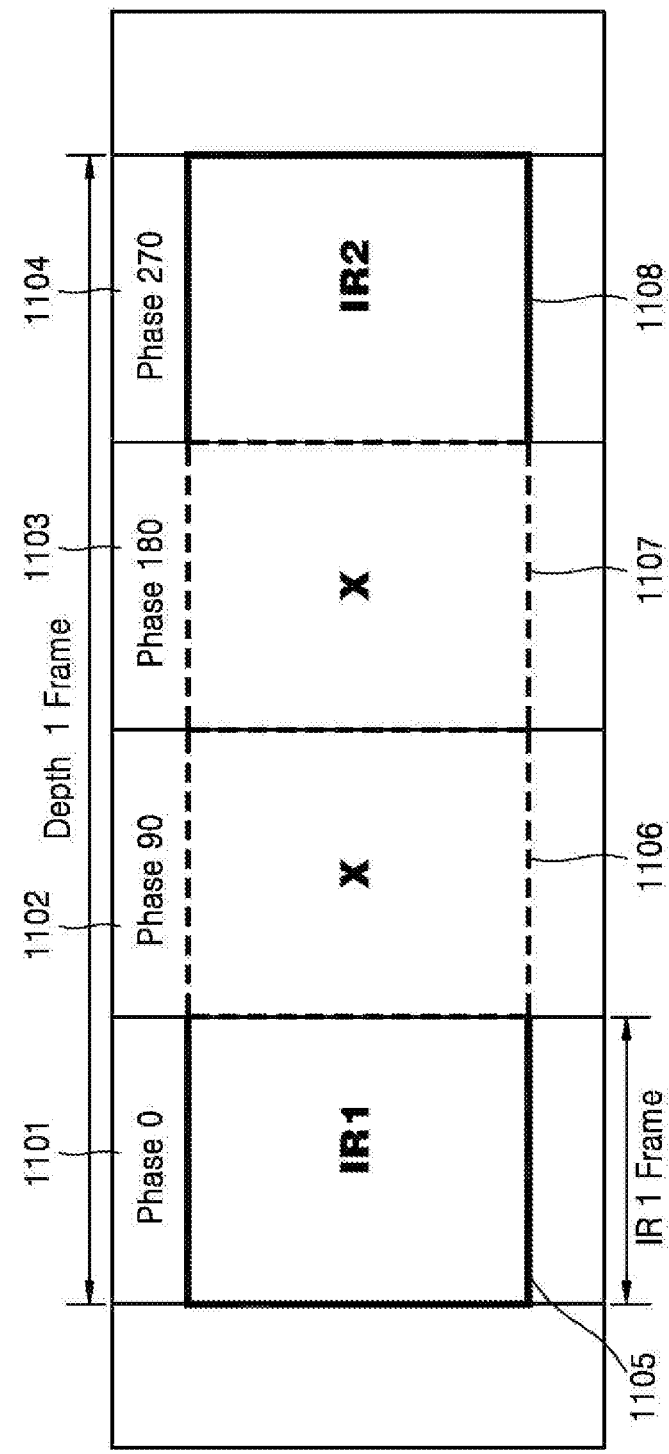
FIG. 11 is a diagram for describing a method of determining a saturated image, according to another exemplary embodiment.

FIG. 11 is a diagram for describing a method of determining a saturated image, according to another exemplary embodiment. FIG. 11 illustrates a case where the processor 610 monitors an IR signal having a phase of 0 degrees and an IR signal having a phase of 270 degrees. Since the image capturing method is the global shutter method, the processor 610 may determine the saturation or unsaturation of the IR image by using only two IR frames 1105 and 1108.

Figure 12:
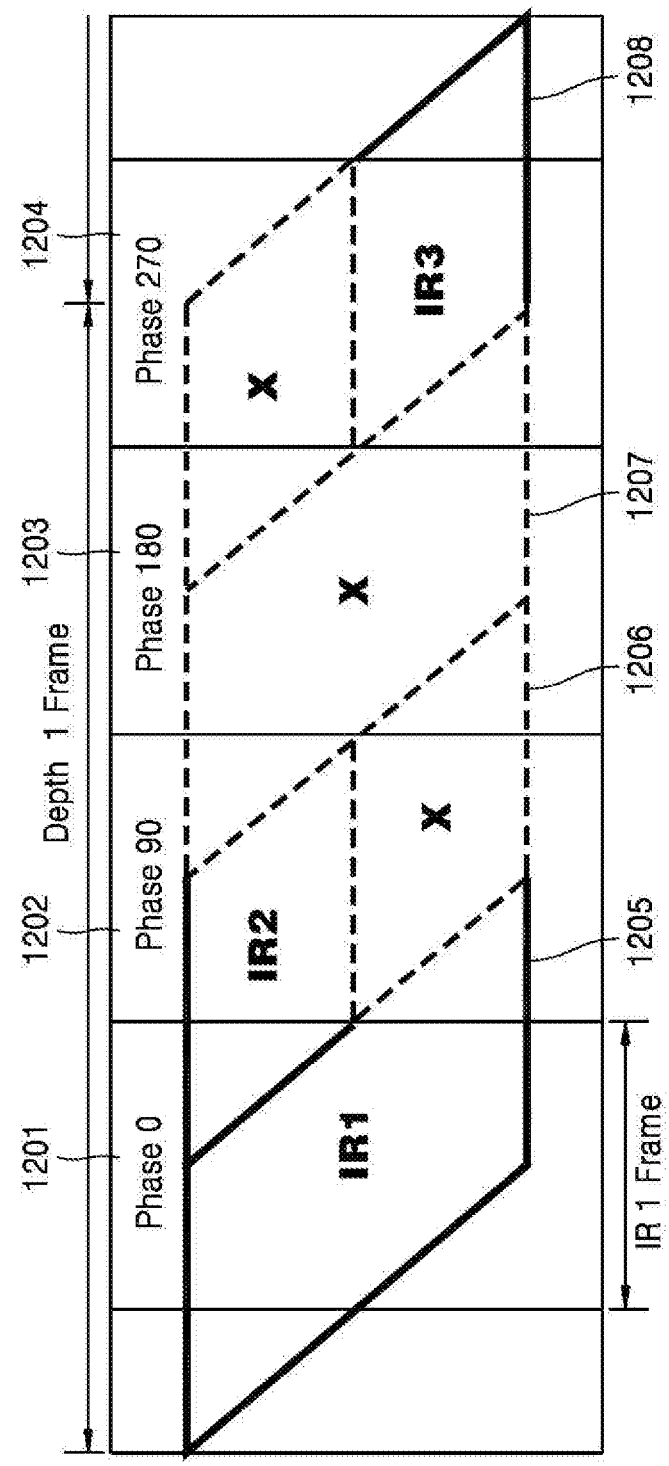
FIG. 12 is a diagram for describing a method of determining a saturated image, according to another exemplary embodiment.

FIG. 12 is a diagram for describing a method of determining a saturated image, according to another exemplary embodiment. Since the image capturing method of FIG. 12 is the rolling shutter method, the processor 610 may use three IR frames 1205, 1206, and 1208 so as to monitor an IR signal having a phase of 0 degrees. Specifically, the processor 610 may monitor the IR signal having a phase of 0 degrees by using only regions indicated by IR1, IR2, and IR3 in the three IR frames 1205, 1206, and 1208.

Figure 13:
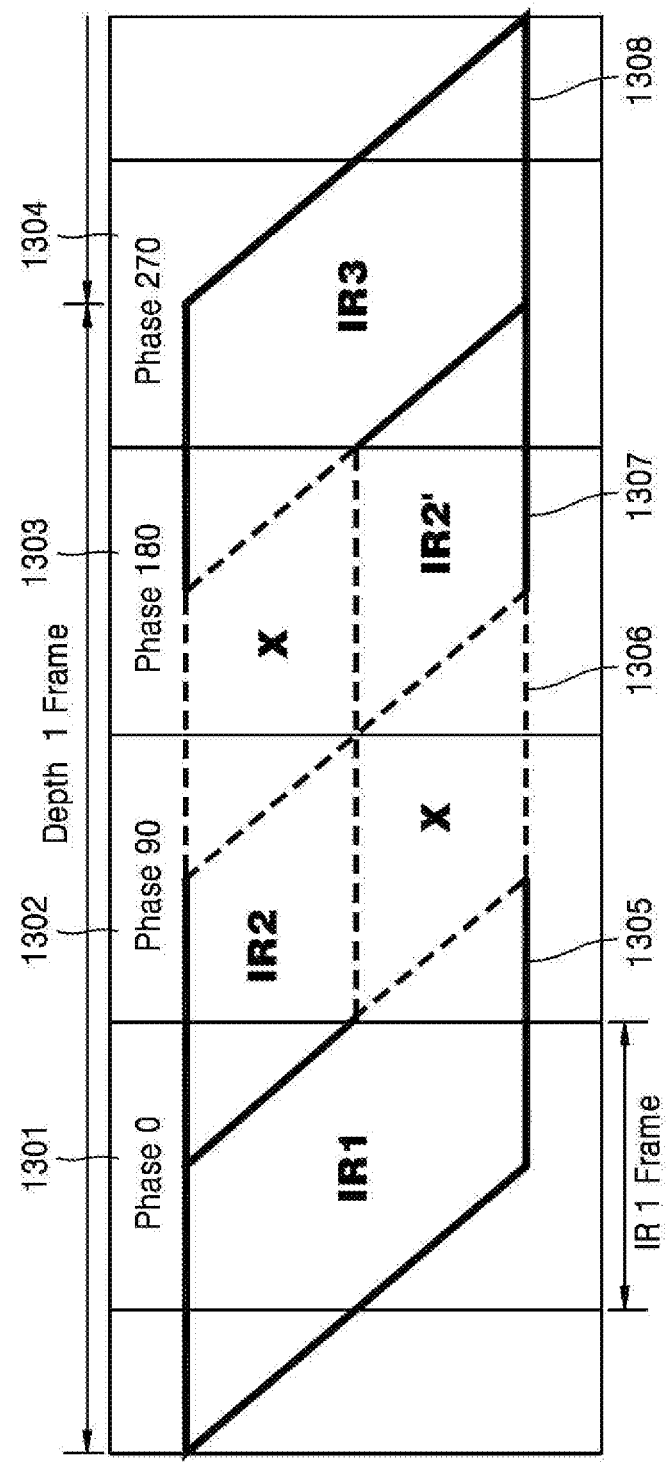
FIG. 13 is a diagram for describing a method of determining a saturated image, according to another exemplary embodiment.

FIG. 13 is a diagram for describing a method of determining a saturated image, according to another exemplary embodiment. FIG. 13 illustrates a case where the processor 610 monitors an IR signal having a phase of 0 degrees and an IR signal having a phase of 270 degrees. Since the image capturing method is the rolling shutter method, the processor 610 may use four IR frames 1305, 1306, 1307, and 1308 so as to monitor the IR signal having a phase of 0 degrees and the IR signal having a phase of 270 degrees. Specifically, the processor 610 may monitor the IR signal having a phase of 0 degrees and the IR signal having a phase of 270 degrees by using only regions indicated by IR1, IR2, IR2', and IR3 in the four IR frames 1305, 1306, 1307, and 1308.

According to exemplary embodiments, it is possible to acquire a high dynamic range image by controlling the intensity of light emitted from the light source.

In addition, it is possible to control the intensity of light emitted from the light source by determining whether the IR image is included.

Furthermore, it is possible to determine the saturation or unsaturation of the IR image by using only one frame.

The device described herein may include a processor, a memory configured to store and execute program data, a permanent storage such as a disk drive, a communication port configured to handle communications with external devices, and user interface devices, including a touch panel, keys, buttons, etc. The methods implemented by software modules or algorithms may be stored as program instructions or computer-readable codes executable on the processor or a non-transitory computer-readable medium. Examples of the non-transitory computer-readable medium may include magnetic storage media (e.g., read-only memory (ROM), random-access memory (RAM), a floppy disk, a hard disk, etc.), and optical readable media (e.g., CD-ROM, digital versatile disc (DVD), etc.). The non-transitory computer-readable recording medium may also be distributed over network-coupled computer systems so that the non-transitory computer-readable code is stored and executed in a distributed fashion. This media may be read by the computer, stored in the memory, and executed by the processor.

The foregoing exemplary embodiments may be described in terms of functional block components and various processing steps. Such functional blocks may be realized by any number of hardware and/or software components configured to perform the specified functions. For example, the exemplary embodiments may employ various integrated circuit components, e.g., memory elements, processing elements, logic elements, look-up tables, and the like, which may carry out a variety of functions under the control of one or more microprocessors or other control devices. Similarly, where the functional blocks are implemented using software programming, the functional blocks may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the exemplary embodiments could employ any number of conventional techniques for electronics configuration, signal processing and/or control, data processing and the like. The words "mechanism" and "element" are used broadly and are not limited to mechanical or physical embodiments, but may include software routines in conjunction with processors, etc.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device.

The use of the term "the" or a similar definite term in the specification (in particular, in the claims) is to be construed to cover both the singular and the plural. In addition, when a range is disclosed in the exemplary embodiments, exemplary embodiments to which individual values belonging to the range are applied may be included (unless otherwise indicated herein), and this is the same as that each of the individual values falling within the range is disclosed in the detailed description of the exemplary embodiments.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A camera comprising:
   a light source configured to emit an infrared (IR) signal;
   a receiver configured to receive the IR signal that is reflected from an object; and
   a processor configured to generate an IR image based on the reflected IR signal, determine whether the IR image is saturated based on comparison between at least one pixel value of the IR image and a reference pixel value, and control an intensity of the IR signal emitted by the light source based on a result of the determination,
   wherein the light source is further configured to emit plurality of IR signals having different phases, the plurality of IR signals being reflected from the object, and
   the processor is further configured to determine whether the IR image is saturated based on at least one of the reflected plurality of IR signals.

2. The camera of claim 1, wherein the processor is further configured to set the reference pixel value and determine that the IR image is saturated when the at least one pixel value of the IR image is greater than the reference pixel value.

3. The camera of claim 1, wherein the processor is configured to gradually reduce or increase the intensity of the IR signal emitted by the light source up to a maximum intensity at which the IR image is unsaturated.

4. The camera of claim 1, wherein the processor is further configured to, in response to determining that the IR image is saturated, reduce the intensity of the IR signal emitted by the light source to a lowest level and gradually increase the intensity of the IR signal emitted by the light source up to a maximum intensity at which the IR image is unsaturated.

5. The camera of claim 1, wherein the processor is further configured to, in response to determining that the IR image is saturated, reduce the intensity of the IR signal emitted by the light source to a lowest level and determine an optimal intensity of the IR signal emitted by the light source based on a saturation degree of the IR image.

6. The camera of claim 1, wherein the plurality of IR signals are four IR signals.

7. The camera of claim 6, wherein the processor is further configured to, when the camera is operated using a global shutter method, determine whether the IR image is saturated based on a frame corresponding to a phase of about 0 degrees.

8. The camera of claim 6, wherein the processor is further configured to, when the camera is operated using a rolling shutter method, determine whether the IR image is saturated based on two or more frames corresponding to a phase of about 0 degrees.

9. A method of generating an infrared (IR) image, the method comprising:
   emitting an IR signal;
   receiving the IR signal that is reflected from an object;
   generating the IR image based on the reflected IR signal;
   determining whether the IR image is saturated based on comparison between at least one pixel value of the IR image and a reference pixel value; and
   controlling an intensity of the IR signal that is emitted based on a result of the determination,
   wherein the emitting the IR signal comprises emitting a plurality of IR signals having different phases, the plurality of IR signals being reflected from the object, and
   the controlling the intensity of the IR signal comprises determining whether the IR image is saturated based on at least one of the reflected plurality of IR signals.

10. The method of claim 9, wherein the controlling the intensity of the IR signal comprises:
    setting the reference pixel value; and
    determining that the IR image is saturated when the at least one pixel value of the IR image is greater than the reference pixel value.

11. The method of claim 9, wherein the controlling the intensity the IR signal comprises gradually reducing or increasing the intensity of the IR signal up to a maximum intensity at which the IR image is unsaturated.

12. The method of claim 9, wherein the controlling the intensity of the IR signal comprises, in response to determining that the IR image is saturated, reducing the intensity of the IR signal to a lowest level and gradually increasing the intensity of the IR signal up to a maximum intensity at which the IR image is unsaturated.

13. The method of claim 9, wherein the controlling the intensity of the IR signal comprises, in response to determining that the IR image is saturated, reducing the intensity of the IR signal to a lowest level and determining an optimal intensity of the IR signal based on a saturation degree of the IR image.

14. The method of claim 9, wherein the plurality of IR signals are four IR signals.

15. The method of claim 14, wherein, when the three-dimensional IR image is generated by a camera using a global shutter method, the controlling the intensity of the IR signal comprises determining whether the IR image is saturated based on a frame corresponding to a phase of about 0 degrees.

16. The method of claim 14, wherein, when the three-dimensional IR image is generated by a camera using a rolling shutter method, the controlling the intensity of the IR signal comprises determining whether the IR image is saturated based on two or more frames corresponding to a phase of about 0 degrees.

17. A non-transitory computer-readable storage medium storing a program that is executed by a computer to perform the method of claim 9.

* * * * *